June 23, 1959 W. S. HASSLER 2,891,703
DISPENSING APPARATUS
Filed May 20, 1957
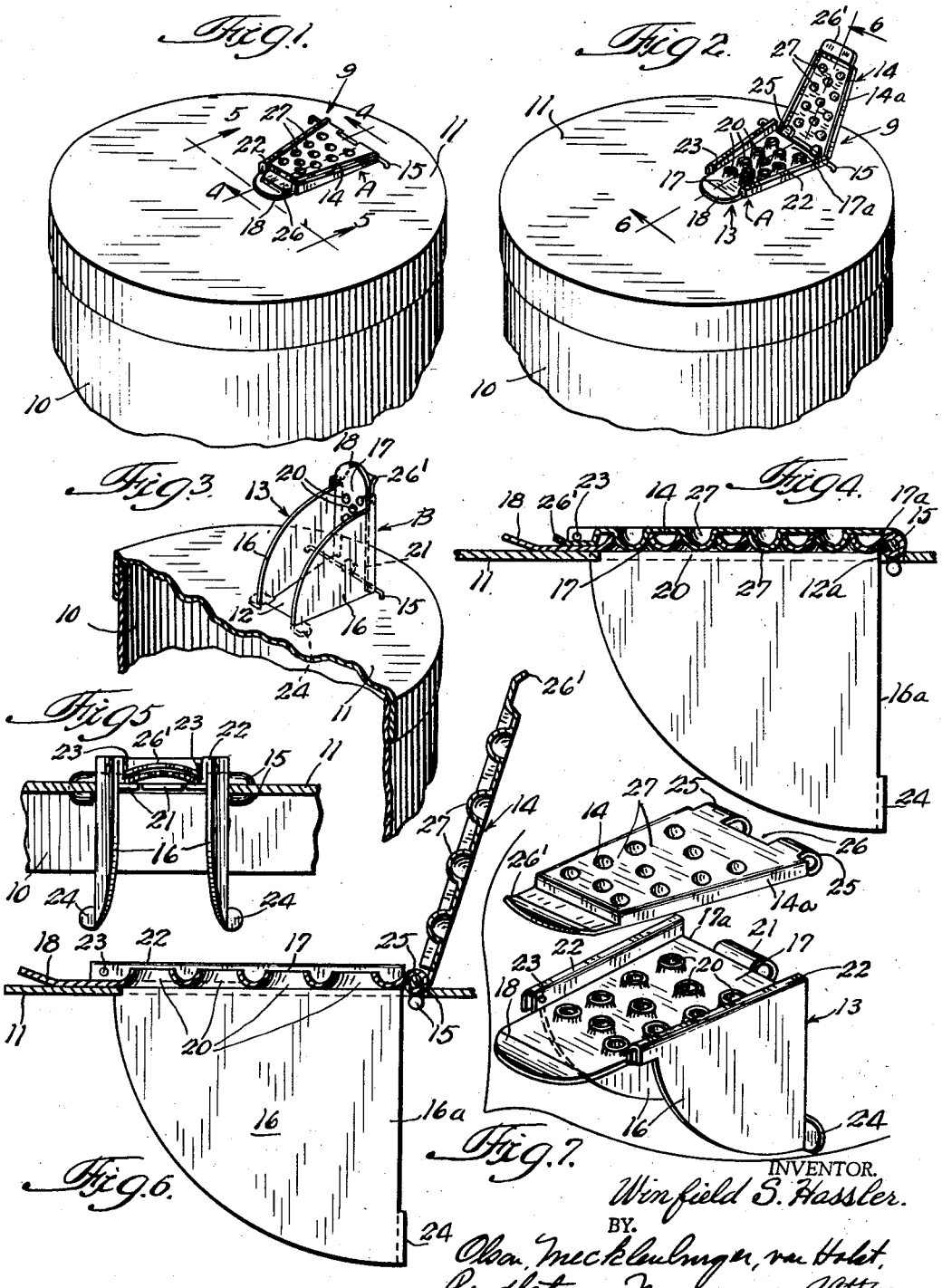
INVENTOR.
Winfield S. Hassler.

United States Patent Office 2,891,703
Patented June 23, 1959

2,891,703

DISPENSING APPARATUS

Winfield S. Hassler, Glenview, Ill., assignor to Morton Salt Company, Chicago, Ill., a corporation of Illinois Application May 20, 1957, Serial No. 660,098

2 Claims. (Cl. 222—480)

This invention relates to a dispensing apparatus and, more particularly, to a combination pouring spout and sifter which may be incorporated in a container for granulated materials and the like.

Various combinations of this type have heretofore been proposed which, because of their construction, are possessed of one or more shortcomings. One such shortcoming is that the prior combinations have required that a plurality of apertures, or one oversize aperture, be formed in the container surface thereby complicating fabrication of such a container, as well as causing the apertured portion of the container to be inherently weak. Secondly, the prior combinations were of costly, delicate and complex construction and tended to become inoperative after a relatively short period of time. Lastly, the prior combinations were incapable of permitting the contents of container to be effectively sifted therefrom.

Thus, it is one of the objects of this invention to provide an improved combination which overcomes the aforementioned shortcomings of the prior art.

It is a further object of this invention to provide an improved combination which is provided with unclogging means and insures proper dispensing of the contents from the container.

A further object of this invention is to provide a combination pouring spout and sifter for containers which is of simple and inexpensive construction and may be readily actuated to effect either unrestricted pouring or sifting of the contents from the container.

Further and additional objects of this invention will appear from a consideration of this specification, the accompanying drawings, and the appended claims.

In carrying out this invention in one form, a container top or wall is provided with an aperture formed therein. The aperture is greater in one dimension than in the other and has the longer sides thereof rectilinear and slightly convergent with respect to one another from one end of said aperture. Pivotally connected to said container top and juxtaposed to said aperture one end is a pouring spout and a flap therefor. The spout is provided with a pair of depending quadrantal-shaped side sections which extend through the aperture into the interior of the container. The convergent sides of the aperture are frictionally engaged by the depending sides of the spout and the latter are interconnected by a perforated section which is substantially parallel to the top surface of the container when the spout is in one position of pivotal adjustment, so that the container contents may be dispensed through the perforations.

The perforated section of the spout is of such dimension that it is capable of completely overlying the container aperture. The flap, which pivots about a common axis with the spout, is imperforate and is adapted to overlie the perforate section of the spout. Means are provided for retaining said flap in said overlying relation whereby said spout and flap may be pivoted as a unit to uncover the container aperture.

For a more complete understanding of this invention, reference will now be made to the accompanying drawings, wherein:

Figure 1 is a fragmentary perspective view of a container illustrating one embodiment of the improved combination pouring spout and sifter mounted thereon and disposed in a closed position.

Fig. 2 is similar to Fig. 1, but illustrates the improved combination in sifter position.

Fig. 3 is similar to Fig. 1, but illustrates the improved combination in pouring position.

Fig. 4 is an enlarged sectional view taken along the line 4—4 of Fig. 1.

Fig. 5 is an enlarged sectional view taken along the line 5—5 of Fig. 1.

Fig. 6 is an enlarged sectional view taken along the line 6—6 of Fig. 2.

Fig. 7 is an enlarged perspective view of the embodiment illustrated in Fig. 1, but with the parts thereof illustrated in exploded relation.

Referring now to the drawings, one form of the improved combination pouring spout and sifter 9 is shown incorporated in a container 10 of the conventional paperboard tubular variety. The combination 9 is mounted on the end-wall 11 of container 10 adjacent an aperture 12 formed in such end-wall. The aperture 12 is preferably of trapezoidal configuration and is disposed to one side of the center axis of the end-wall 11.

Combination 9, as shown more clearly in Fig. 7, comprises a spout member 13 and a flap piece 14, both of which are mounted for independent or unitary pivotal movement about a common axis. The axis in this instance consists of a staple 15 in juxtaposition to the side 12a of aperture 12, that is, the side 12a adjacent the periphery of end-wall 11, as shown most clearly in Fig. 3.

Spout member 13 is preferably of one-piece construction and includes a pair of relatively spaced, substantially quadrantal-shaped side sections 16 and a base section 17 which interconnects a corresponding edge portion of each side section. Base section 17 is of substantially the same configuration as end-wall aperture 12 and is adapted to overlie aperture 12 when the spout member 13 is in its closed position A as shown in Figs. 1 and 2. The side of base section 17, opposite the pivotally connected side 17a thereof, extends beyond the perimeter of aperture 12 and is turned upwardly a slight amount to form a finger tab 18. Base section 17 is provided with a plurality of perforations 20 which are arranged substantially uniformly over the area of the section coincident to the end-wall aperture 12, when said section is in overlying relation therewith. A tongue 21 protrudes from side 17a of base section 17 and embraces staple 15.

The junctures of base section 17 and side sections 16 of spout member 13, in this instance, form elongated beads or flanges 22 which are disposed normal to the plane of base section 17. The function of such flanges will become apparent from the discussion to follow hereinafter. A protuberance 23 may be formed, if desired, on the inner surface of each flange 22 (see Fig. 7).

The depending side sections 16 are disposed, in this instance, in sliding frictional engagement with the non-parallel sides of container aperture 12. The side sections 16 extend into the interior of the container in the conventional manner, and each has formed in the linear edge 16a thereof, angularly disposed with respect to base section 17, an outwardly extending lip 24. The lips 24 are adapted to engage the concealed surface of end-wall 11 circumjacent aperture 12 and limit the extent to which the spout member 13 can be moved to its open position B (see Fig. 3).

Flap piece 14, as seen more clearly in Figs. 6 and 7, is provided with a pair of relatively spaced tongues 25, which project from one side thereof and are bent to embrace staple 15. The tongue 21, formed on base section 17, is accommodated within the space 26 between tongues 25, when the combination 9 is assembled on the container end-wall 11. The shape of piece 14 is such that the elongated side edges 14a thereof will frictionally engage the inner surfaces of the spout member flanges 22 when the flap piece is pivoted into overlying relation with base section 17 and thereby retain said flap piece in such position. The protuberances 23 on the flange inner surfaces may be utilized to increase this frictional engagement.

The edge of piece 14, opposite the side thereof from which the tongues 25 extend, is turned upwardly a slight amount to form a finger tab 26, which is adapted to partially overlie finger tab 18. Tab 18, however, protrudes beyond tab 26 in order to enable flap piece 14 to be readily pivoted independently of spout member 13, while the latter remains in its closed position A, and thereby permit the contents of the container to be readily sifted through perforate base section 17. On the other hand, tab 18 enables both member 13 and piece 14 to be pivoted as a unit to open position B, whereby the contents can be poured in an unrestricted manner from the container.

Flap piece 14 has the surface thereof, adjacent base section 17 of member 13, provided with a plurality of protuberances 27 which are so disposed relative to one another that they protrude into the perforations 20 formed in base section 17 (see Fig. 4) and thus prevent clogging of the perforations by the material to be dispensed from the container. In addition, protuberances 27 seal off perforations 20 and thus prevent leakage of the material through base section 17, when the spout member 13 is in position A.

It will be obvious that certain modifications of the specific embodiment indicated may be made without departing from the spirit and scope of this invention. For example, the arcuate side portions 16 may be fabricated separately from the sifting element 13, and the arcuate side portions 16 may, after insertion in the aperture of the container end closure, be bent at their inward ends away from each other so that greater friction between the portions 16 and the sides of the aperture may be obtained. Thus, a dispensing apparatus has now been disclosed which is of a simple, inexpensive, non-clogging construction, and which allows a flexibility as to pouring and sifting operations.

While a particular embodiment of the invention has been shown, it will be understood, of course, that the invention is not to be limited thereto, since many modifications may be made, and it is, therefore, contemplated to cover by the appended claims any such modifications as fall within the true spirit and scope of the invention.

I claim:

1. A dispensing device for use with an apertured container, said device comprising a pivotally mounted first member having a pair of relatively spaced imperforate side sections for slidably and frictionally engaging peripheral portions of a container aperture and a perforate base section interconnecting corresponding portions of said side sections, said first member being movable into and out of a position wherein said base section overlies such container aperture, a pivotally mounted imperforate second member movable independently of said first member, said second member being provided with a plurality of projections extending through and closing off said base section perforations, when said second member is in a predetermined position of pivotal adjustment relative to said first member, and protruding means carried by said first member and frictionally engaging the periphery of said second member for retaining the latter in said predetermined position of pivotal adjustment.

2. A dispensing device for use with an apertured container, said device comprising a pivotally mounted first member having a pair of spaced imperforate side sections connected to opposite margins of a perforate base section, said first member being movable into and out of a position wherein said base section overlies a container aperture, an imperforate pivotally mounted second member movable independently of said first member into and out of a predetermined position with said first member base section wherein the perforations of the latter accommodate corresponding protuberances formed on said second member, said first and second members being provided with peripheral tab portions, the tab portion of said second member being in partial overlapping relation with the tab portion of said first member when the protuberances of said second member are accommodated by the perforations of said first member, said first and second members being pivotal about and connected to a common axis, said spaced imperforate side sections being in adjustable frictional engagement with corresponding opposite sides of said container aperture, the base section of said first member being provided with spaced protruding segments between which said second member is disposed and in frictional engagement therewith, when said second member is in said predetermined position.

References Cited in the file of this patent

UNITED STATES PATENTS

| | | |
|---|---|---|
| 348,752 | Lemos | Sept. 7, 1886 |
| 2,589,819 | Klausman | Mar. 18, 1952 |